United States Patent [19]

Okamura

[11] 4,155,390
[45] May 22, 1979

[54] TRACTION DEVICE

[76] Inventor: Yoichi Okamura, 6-13 Hanasaki 1-chome, Narashino-shi, Chiba-ken, Japan

[21] Appl. No.: 816,868

[22] Filed: Jul. 18, 1977

[30] Foreign Application Priority Data

| Nov. 19, 1976 | [JP] | Japan | 51-138464 |
| Nov. 19, 1976 | [JP] | Japan | 51-154470[U] |
| Nov. 29, 1976 | [JP] | Japan | 51-158415[U] |
| Apr. 28, 1977 | [JP] | Japan | 52-48420 |
| Apr. 28, 1977 | [JP] | Japan | 52-53411[U] |

[51] Int. Cl.² ............................................. B60C 27/20
[52] U.S. Cl. ................................... 152/222; 152/226
[58] Field of Search .......................... 152/217–222, 152/225–230

[56] References Cited

U.S. PATENT DOCUMENTS

| 1,213,256 | 1/1917 | Pyros | 152/221 |
| 1,388,748 | 8/1921 | Olander | 152/221 X |
| 1,577,684 | 3/1926 | Bond | 152/221 |
| 1,830,556 | 11/1931 | Nelson | 152/222 |
| 1,943,918 | 1/1934 | King | 152/221 X |
| 2,705,520 | 4/1955 | Erving | 152/219 |
| 4,055,210 | 10/1977 | Mongault | 152/221 X |

FOREIGN PATENT DOCUMENTS 613711 12/1932 Fed. Rep. of Germany ........... 152/221

Primary Examiner—Joseph F. Peters, Jr.
Assistant Examiner—D. W. Underwood
Attorney, Agent, or Firm—Wenderoth, Lind & Ponack

[57] ABSTRACT

A traction device includes a series of elastomeric traction elements adapted to the circumference of a tire of an automotive vehicle. Each traction element has a substantially U-shaped elastomeric body, a plurality of reinforcing wires arranged in parallel and embedded in the elastomeric body along the lengthwise direction thereof, cross bars also embedded in the elastomeric body and integrally connected to opposite ends of the reinforcing wires at substantially right angles therewith, and a plurality of openings formed through the elastomeric body adjacent to the inner edges of the cross bars. Metal fasteners extend through the openings and are anchored to the traction element and connect the latter to ropes to be disposed at both side circumferences of the tire.

7 Claims, 11 Drawing Figures

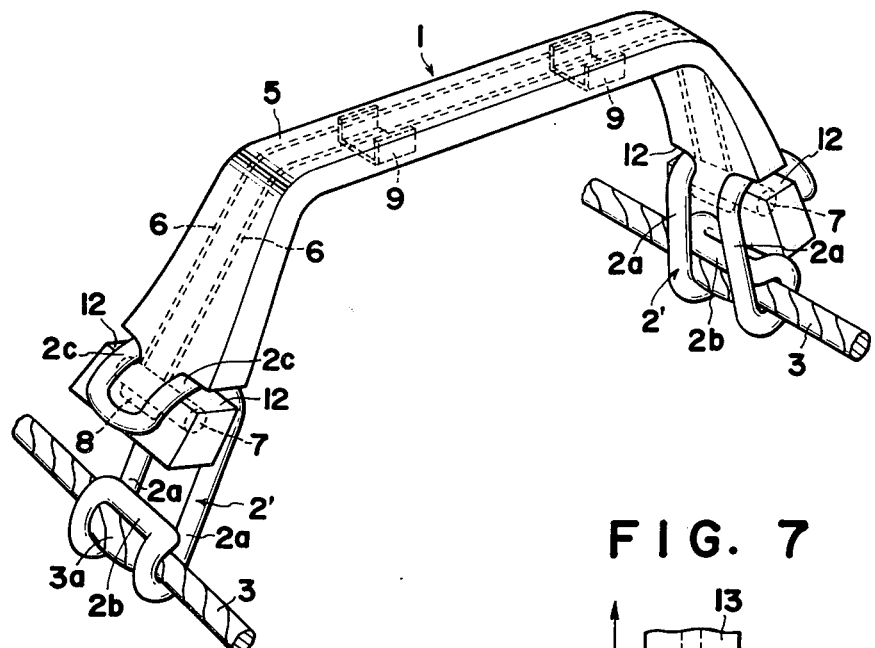
FIG. 5
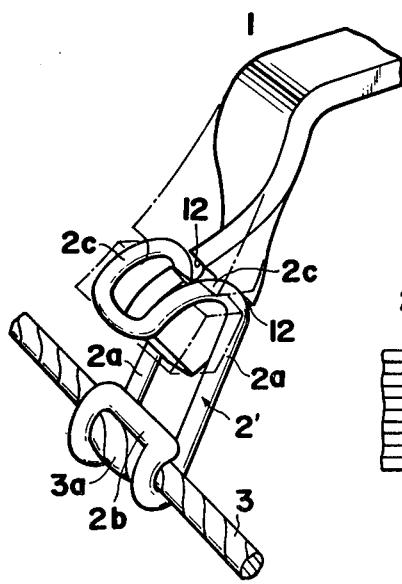
FIG. 6
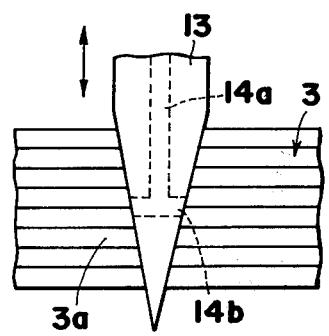
FIG. 7
FIG. 8

TRACTION DEVICE

BACKGROUND OF THE INVENTION

This invention relates to a traction device comprising a series of elastomeric traction elements applied to the circumference of a tire of an automotive vehicle so as to facilitate automobile or truck movement on a snow or ice surface.

It is known to provide a traction device in which each of the elastomeric traction elements is detachably connected to ropes, cables or the like at both side circumferences of the tire by a pair of metal fasteners secured at ends thereof to the ropes. The traction device of this type is preferable since one traction element injured for some reason can be replaced with another new one by removing the injured one from the associated metal fasteners at both ends thereof. Recently, in order to give high durability to the traction element against rough usage, there has been provided a traction element in which a reinforcing cable is embedded through an elastomeric body.

However, the reinforcing cable has merely been embedded through the elastomeric body, and no special attention has been paid in connection with the metal fasteners. Accordingly, when the traction device is used for a relatively long period of time, the elastomeric body is broken at the portions thereof connected to the metal fasteners.

On the other hand, when the reinforcing cable is extended out of the elastomeric body at both ends thereof so that the metal fasteners can be anchored to these ends, the elastomeric body may become loose relative to the reinforcing cable while in use and cannot attain the desired effects of gripping the snow or ice surface firmly by the elastomeric body.

Accordingly, an object of the present invention is to provide a traction device wherein each of the elastomeric traction elements is firmly connected to ropes, cables or the like at both circumferential sides of a tire by a pair of metal fasteners without injuring the elastomeric body thereof.

Another object of the present invention is to provide a traction device of the type set forth above wherein the metal fasteners can be easily and firmly anchored to the traction elements.

Still another object of the present invention is to provide a traction device of the type set forth above wherein the traction elements are firmly connected to the ropes or the like by metal fasteners without being shifted along the rope.

SUMMARY OF THE INVENTION

According to the present invention, a traction device adapted to the circumference of a tire of an automotive vehicle comprises a series of elastomeric traction elements, a pair of rope means adapted to be disposed at both side circumferences of the tire, and metal fasteners each detachably anchored at one end portion thereof to the traction element and firmly secured at the other end portion thereof to the rope means. Each elastomeric traction element has a substantially U-shaped elastomeric body adapted to grip the circumference of the tire, a plurality of reinforcing wires arranged in parallel and embedded in the elastomeric body along the lengthwise direction thereof, cross bars also embedded in the elastomeric body and integrally connected to opposite ends of the reinforcing wires at substantially right angles therewith, and a plurality of openings formed through the elastomeric body adjacent to the inner edges of the cross bars, through the openings of which the metal fasteners are anchored to the traction element.

Preferably, the elastomeric body is reinforced at end portions thereof between the openings by a rib integrally formed with the elastomeric body.

The cross bar is preferably die-casted to the ends of the wires in such a manner that the ends of the wires are radially extended through the cross bar and integrally connected by an end ear which is also die-casted together with the cross bar.

The metal fasteners for connecting each end of a traction element to a rope means has, preferably, a pair of C-shaped sections, first ends of which may be separated to form a pair of curved pawls or may be integrally connected.

In the event that the above-mentioned metal fastener having a pair of the curved pawls is used in connection with the traction element, the openings formed through the elastomeric body are a pair of round holes each snugly receiving the pawl. On the other hand, in the event that the metal fastener having the integrally connected end is used in connection with the traction element, the openings formed through the elastomeric body are a pair of slits extending to opposite side edges of the elastomeric body from the inner edge of the cross bar.

The elastomeric traction element is formed by integrally connecting both end portions of reinforcing wires to cross bars with the wires being in parallel, placing the reinforcing wires in the shape of an inverted "U" upon a plurality of spaced guide plates with the wires being stretched by projections abutting against the inner end of each of the cross bars, forming a closed space around the reinforcing wires and the cross bars with the projections traversing the closed space, and extruding a molten elastomeric material into the closed space.

The aforementioned and other objects and features of the present invention will become apparent from the following detailed description of preferred embodiments thereof when taken in conjunction with the accompanying drawings, in which:

DESCRIPTION OF THE DRAWINGS

FIG. 5 is a perspective view showing another elastomeric traction element connected at both ends thereof to ropes by another type of metal fastener, according to another embodiment of the present invention, FIG. 6 is a fragmentary view showing the manner of anchoring the metal fastener to the traction element shown in FIG. 5, FIG. 7 is a fragmentary sectional view showing the manner of expanding a part of a rope to be calked by the metal fastener, FIG. 8 is a fragmentary sectional view showing the rope expanded in the manner shown in FIG. 7.

DETAILED DESCRIPTION OF THE INVENTION

Figure 1:
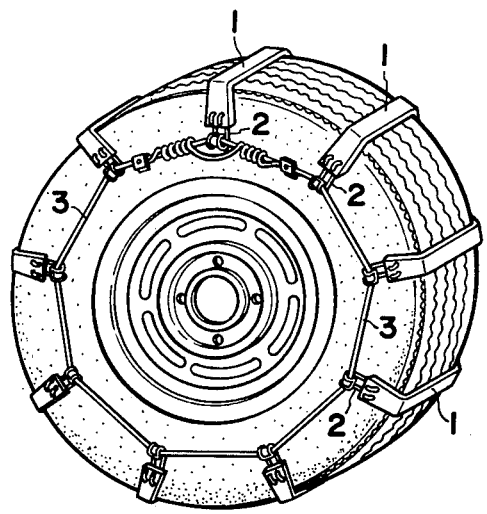
FIG. 1 is a perspective view showing a traction device according to an embodiment of the present invention which is applied to the circumference of a tire of an automotive vehicle.

Referring to a traction device according to a first embodiment of the present invention shown in FIGS. 1 through 4, the device comprises a series of elastomeric traction elements 1, metal fasteners 2 and a pair of ropes 3. The traction elements 1 are applied to the circumference of a tire 4 of an automotive vehicle. Each traction element 1 is shaped substantially in the form of "U" to grip the circumference of the tire 4 and is mainly composed of elastomeric an body 5 such as rubber or synthetic resin. Embedded within the elastomeric body 5 along the lengthwise direction thereof are two parallel reinforcing steel wires 6 which terminate at opposite end portions thereof within the elastomeric body and which are integrally connected with cross bars 7. Preferably, the cross bars 7 are die-casted to both portions of the steel wires 6 in such a manner that each end of each of the steel wires extend radially through the respective cross bar 7. The adjacent ends of the steel wires 6 extended beyond the respective cross bar 7 are integrally connected by an end ear 8 which is also die-casted together with the cross bar 7. Also embedded within the intermediate section of the elastomeric body 5 are a plurality of U-shaped metal spike members 9, the upper open ends of which are partially exposed above or substantially flush with the flat outer surface of the elastomeric body.

The elastomeric body 5 is provided with a pair of circular holes 10 at each end portion thereof adjacent to the inner side of the respective cross bar 7 and the outer sides of the respective ends of the steel wires 6. Each end portion of the elastomeric body 5 between the paired holes 10 is provided with a triangular-shaped rib 11 at the inner surface thereof, which serves to reinforce the elastomeric material between the holes 10 and to facilitate the anchoring of metal fastener 2 through the holes.

The metal fastener 2 is firmly secured at one end portion thereof to the rope 3 but is detachable relative to the traction element 1. The metal fastener 2 of this embodiment is formed from a piece of metal rod which is bent to form a pair of C-shaped sections 2a, first with ends which are integrally connected by a horizontal section 2b, which is calked to the rope 3. The other ends of the metal fastener 2 are separated from each other and form a pair of pawls 2c, which are anchored to the traction element by being extended through the circular holes 10. To anchor the metal fastener 2 to the traction element, the pawls 2c of the metal fastener 2 are partially inserted into the holes 10 of the traction element as shown by the solid line in FIG. 4, and then the metal fastener is rotated in the direction shown by the arrow in FIG. 4.

In the second embodiment shown in FIGS. 5 and 6, the elastomeric body 5 of the traction element 1 is provided at each end portion thereof, adjacent to the inner edge of the cross bar 7, with slits 12 in place of the circular holes 10 of the first embodiment. Each slit 12 extends to the side edge of the elastomeric body 5.

The metal fastener to be used in this second embodiment may be the same as that used in the first embodiment. However, it is preferable to use the metal fastener 2' of the type shown in FIGS. 5 and 6, in which a pair of C-shaped sections 2a formed from the metal rod are integrally connected with each other at both the upper and lower ends. To anchor this metal fastener 2', which has previously been calked at one end 2b thereof to the rope 3, to the traction element, the end portion of the traction element 1 is bent at substantially right angles relative to the intermediate portion thereof and inserted into a space between the other ends 2c of the C-shaped sections 2a as shown by the solid line position in FIG. 6. Then, the end portion of the traction element 1 is forcedly returned to the original state by pressing the slits 12 against the ends 2c of the metal fastener 2'. Thus, the ends 2c of the metal fastener 2' are inserted into the slits 12 and anchored thereto, as shown by the dotted line position in FIG. 6.

In the first and second embodiments set forth above, each of the metal fasteners 2 and 2' anchored to the traction element abuts against the inner edge of the cross bar 7 which in turn is integrally connected to the reinforcing steel wires 6, so that even when high tension is applied repeatedly to the traction element under rough usage for a long period of time, the elastomeric body 5 cannot be broken or torn by the metal fastener 2. The metal fastener 2 in the first embodiment can be anchored quite easily to the traction element. However, the structure of the second embodiment has an advantage that the traction element 1 once anchored to the metal fastener 2' cannot be detached therefrom even when the curved anchored end of the metal fastener is elongated due to high tension applied thereto while in use.

In the traction device set forth above, it is also desired that the metal fastener anchored to the traction element be firmly secured to the rope in order that the metal fasteners cannot be shifted along the rope. It has been described in the above embodiments that the one end of the metal fastener is calked to the rope. However, it is preferable that the rope portions 3a between the pair of C-shaped sections 2a be expanded before or after being calked by the horizontal section 2b of the metal fastener 2. To expand the rope portion 3a, a needle 13 having axial and radial passage 14a and 14b therein is pierced into the rope portion 3a such that the radial passage 14b is positioned at the axial center part of the rope, as shown in FIG. 7. Then, a hardening agent, which is solidified and hardened soon after being exposed to the air, is forcedly extruded. Thus, soon after the extrusion of the hardening agent, the rope part 3a is expanded as shown in FIG. 8, wherein the hardening agent is designated by reference numeral 15. The expanded rope part 3a is sandwiched between the pair of C-shaped sections 2a and calked by the horizontal section 2b of the metal fastener 2 so that the metal fastener cannot be shifted along the rope 3.

A method for forming a traction element shall be described hereinafter with reference to FIGS. 9 and 11.

First of all, two cross bars 7 as well as the end ears 8 are die-casted to both ends of a pair of parallel reinforcing steel wires 6 in such a manner that the ends of the wires radially extend through the cross bars 7 and terminate at the end ears 8. Thus, both opposite ends of both of the wires are integrally connected to the cross bars and the end ears. Even if an extraordinarily high tension is applied to the wires against the cross bars, the wires cannot be pulled out of the cross bars since, the end ears are also integral with the ends of the wires and the cross bars.

Figure 10:
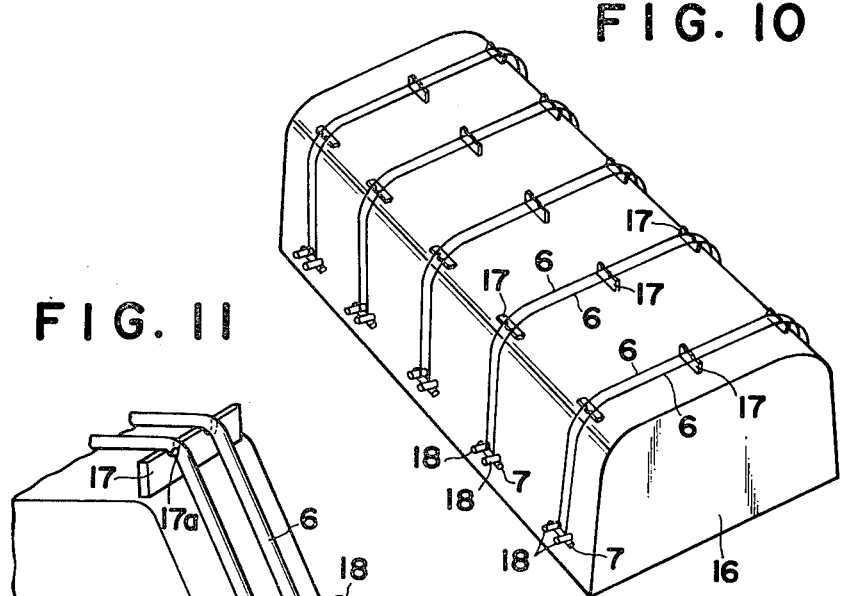
FIG. 10 is a perspective view showing a core on which a plurality of reinforcing wires are stretched.

The wires 6 thus connected to the cross bars 7 and end ears 8 are then placed in the shape of an inverted "U" on a core 16 of the mould. The upper and side surfaces of the core 16 have substantially the same configuration in section as the circumferential surface of a tire. The core 16 is provided with a plurality of guide plates 17 on the upper surface thereof and a pair of projections or posts 18 at each lower end portion thereof. Each guide plate 17 has a pair of semi-circular guide holes 17a on which the wires 6 are placed as shown in FIG. 11. The posts 18 extend at right angles with the inclined side surfaces of the core 16 and abut against the inner edge of the cross bars 7 with the wires 6 positioning between the paired posts 18, whereby the wires 6 are placed on the core 16 under a stretched condition. It is preferable that a plurality of the paired wires are arranged on the same core 16 with predetermined intervals therebetween as shown in FIG. 10.

The core 16 thus provided with the reinforcing wires 6 is placed in male and female moulds 19 and 20, respectively. The moulds 19 and 20 and the core 16 define an inverted substantially U-shaped closed space around the paired reinforcing wires 6, as shown in FIG. 9. At this position, the posts 18 at the lower end portions of the core 16 traverse the closed space, and the upper ends of posts 18 contact the inner surface of the female mould. Then, a molten elastomeric material 21 such as rubber, which is filled in a cavity of a pot 22 on the female mould 20, is extruded into the closed space through passages 23 in the female mould 20 by the pressure of a piston 24 as shown in FIG. 9.

After the elastomeric material 21 has been solidified, the moulds 19 and 20 are separated to remove the formed traction element from the core 16.

According to this method, the reinforcing wires 6 as well as the cross bars 7 are embedded quite easily in the elastomeric body 5. The posts 18 at both ends of the wires 6 serve not only to hold the wires under the stretched condition but also to form the openings 10 adjacent to each cross bar 7, which openings are adapted to be anchored by the metal fastener 2.

Figure 2:
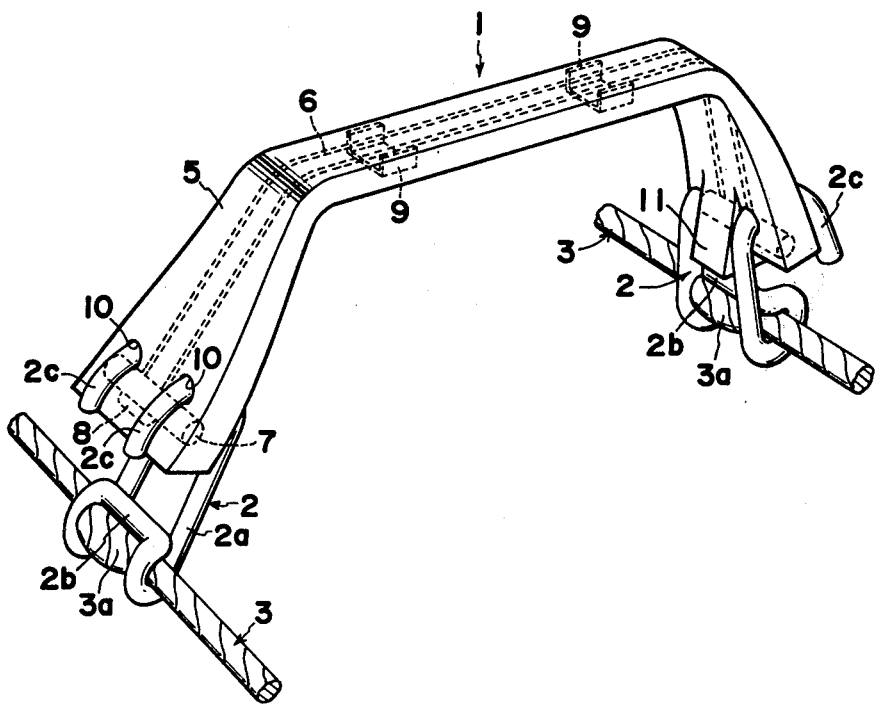
FIG. 2 is an enlarged perspective view showing an elastomeric traction element included in the device in FIG. 1 and connected at both ends thereof to ropes by metal fasteners.
Figure 3:
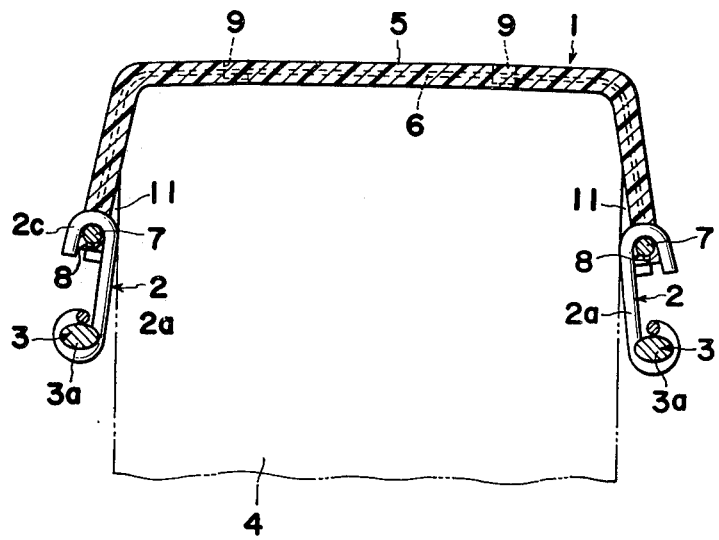
FIG. 3 is a transverse sectional view of the traction element, metal fasteners and ropes shown in FIG. 2.
Figure 4:
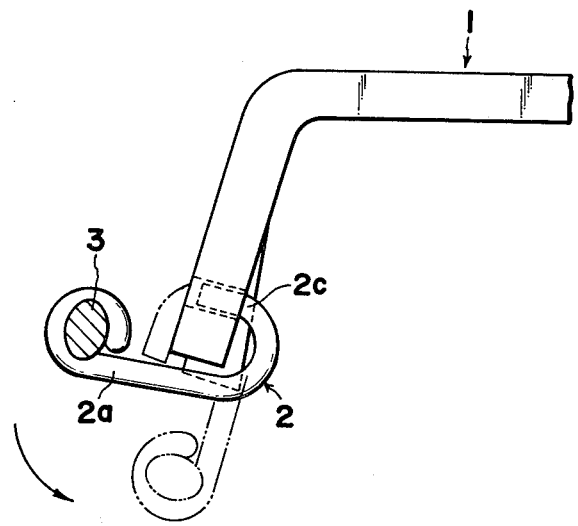
FIG. 4 is a fragmentary view showing the manner of anchoring the metal fastener to the traction element shown in FIG. 2.
Figure 9:
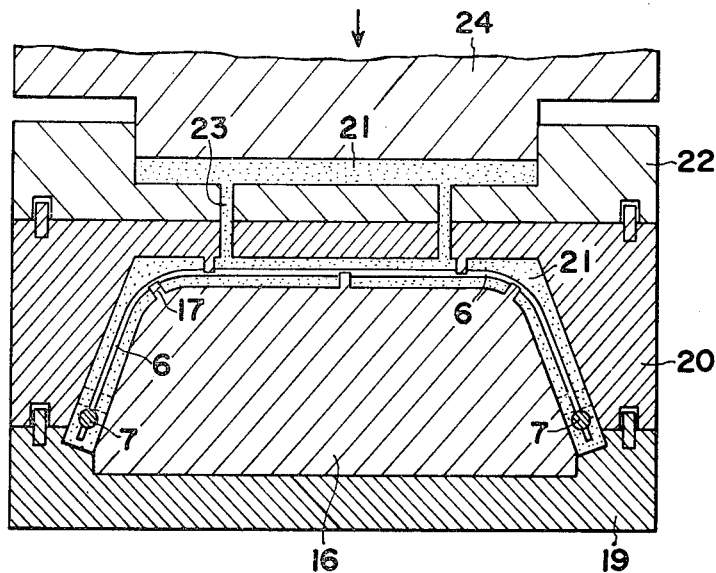
FIG. 9 is a sectional view for explaining the method for forming the elastomeric traction element according to the present invention.
Figure 11:
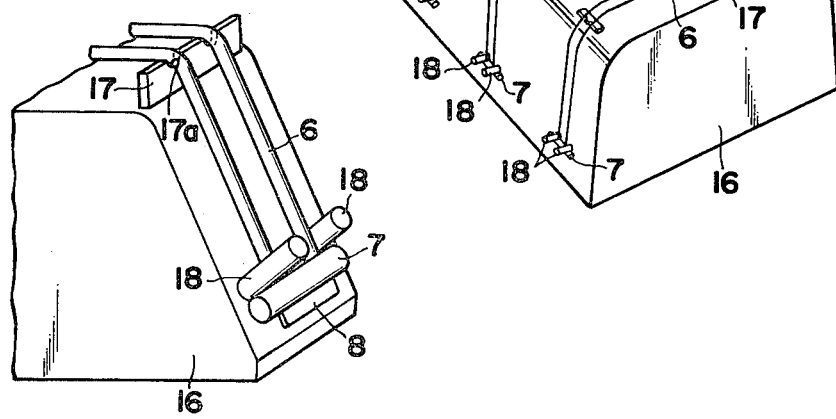
FIG. 11 is an enlarged fragmentary view showing an end portion of the core in FIG. 11.

Although it is not shown in FIGS. 9 to 11, inverted U-shaped spike metals 9 (FIG. 2) may be disposed on the upper surface of the core 16 at intervals so as to be embedded in the elastomeric body 5 as shown in FIG. 2. Further, although the cylindrical posts 18 at the ends of the core 16 are adapted to form circular openings through the end portions of the traction element so as to be anchored by the curved pawls 2c of the metal fastener shown in FIG. 2, rectangular posts may be used in place of the cylindrical posts to form slits extending to side edges of the traction element so as to be anchored by the metal fastener of the type shown in FIG. 5. Also, the core 16 may be integral with the male mould 19.

The present invention is not limitted to the embodiments set forth above, but many modifications and alterations may be made thereto within the spirit of the present invention. For example, the ropes disposed at both side circumferences of the tire may be replaced by wires, cables or chains. The term "rope means" used herein includes all such possibilities.

What is claimed is:

1. A traction device adapted to be applied to the circumference of a tire of an automotive vehicle, said device comprising:
    a plurality of elastomeric traction elements, each said traction element comprising a substantially U-shaped elastomeric body adapted to grip the circumference of a tire, a plurality of reinforcing wires arranged parallel to each other and embedded in said elastomeric body along the lengthwise direction thereof, cross bars embedded in said elastomeric body, one each of said cross bars being embedded in each opposite end of said elastomeric body, each said cross bar being die-cast and integrally connected to adjacent ends of said wires and extending substantially transverse thereto, said ends of said wires extending radially through respective said cross bars and being integrally connected by end ears which are integrally die-cast with respective said cross-bars, and each said opposite end of said elastomeric body having extending therethrough a plurality of openings located at positions adjacent the inner edge of the respective said cross bar;
    a pair of rope means adapted to be disposed at opposite side circumferences of a tire; and
    a plurality of metal fasteners, each of said metal fasteners having a first portion anchored to one of said rope means and a second portion extending through said openings of an end of one of said elastomeric traction elements.

2. A traction device as claimed in claim 1, wherein each said elastomeric body has ribs integral therewith at end portions between said openings.

3. A traction device as claimed in claim 1, wherein each said metal fastener includes a pair of substantially C-shaped sections, and said openings are holes for snugly receiving first ends of said C-shaped sections.

4. A traction device as claimed in claim 1, wherein each said metal fastener includes a pair of substantially C-shaped sections first ends of which are integrally connected, and said openings are a pair of slits extending to the side edges of said elastomeric body for receiving the connected first ends of said metal fastener.

5. A traction device as claimed in claim 1, wherein each said metal fastener includes a pair of substantially C-chaped sections calked at first ends thereof to said rope means.

6. A traction device as claimed in claim 5, wherein each rope portion to be calked between a pair of said C-shaped sections is expanded.

7. A traction device as claimed in claim 6, wherein each said expanded rope portion has a solidified material therein.

* * * * *